(12) United States Patent
Takada et al.

(10) Patent No.: US 11,677,915 B2
(45) Date of Patent: Jun. 13, 2023

(54) IMAGE DISPLAY DEVICE

(71) Applicant: SONY CORPORATION, Tokyo (JP)

(72) Inventors: Masahiro Takada, Tokyo (JP);
Norihiro Ohse, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 16/979,235

(22) PCT Filed: Mar. 8, 2019

(86) PCT No.: PCT/JP2019/009338
§ 371 (c)(1),
(2) Date: Sep. 9, 2020

(87) PCT Pub. No.: WO2019/188121
PCT Pub. Date: Oct. 3, 2019

(65) Prior Publication Data
US 2020/0404226 A1 Dec. 24, 2020

(30) Foreign Application Priority Data
Mar. 27, 2018 (JP) .............................. JP2018-059503

(51) Int. Cl.
*H04N 9/31* (2006.01)
*G03B 21/60* (2014.01)
*G06F 3/042* (2006.01)

(52) U.S. Cl.
CPC ............ *H04N 9/317* (2013.01); *G03B 21/60* (2013.01); *G06F 3/0421* (2013.01); *H04N 9/3147* (2013.01)

(58) Field of Classification Search
CPC .... H04N 9/317; H04N 9/3147; H04N 9/3185; H04N 9/12; H04N 9/3194; G06F 3/0421;
(Continued)

(56) References Cited

U.S. PATENT DOCUMENTS 6,023,369 A 2/2000 Goto
10,412,380 B1 * 9/2019 Neira ................... H04N 9/3147
(Continued)

FOREIGN PATENT DOCUMENTS

JP  H10-062870  3/1998
JP  H11-064975  3/1999
(Continued)

OTHER PUBLICATIONS

International Search Report prepared by the Japan Patent Office dated Apr. 26, 2019, for International Application No. PCT/JP2019/009338.

*Primary Examiner* — John W Miller
*Assistant Examiner* — Sean N. Haiem
(74) *Attorney, Agent, or Firm* — Sheridan Ross P.C.

(57) ABSTRACT

An image display device includes M (M≥2) ultra-short focus projectors and reflective directional screens that reflect projection light rays from the corresponding ultra-short focus projectors. The ultra-short focus projectors are arranged above or below the directional screens on which the ultra-short focus projectors are supposed to project images. Adjacent directional screens are tightly arranged. The adjacent directional screens are arranged to form an angle of less than 180 degrees.

8 Claims, 15 Drawing Sheets

(58) Field of Classification Search
CPC ......... G06F 3/0425; G06F 2203/04108; G03B 21/60; G03B 21/53; G03B 21/602; G03B 37/04; G02B 17/004; G02B 5/0278; G02B 5/0242; G02B 5/0231
USPC ........................................................ 348/745
See application file for complete search history.

(56) References Cited

U.S. PATENT DOCUMENTS

| | | | | |
|---|---|---|---|---|
| 2014/0036359 A1* | 2/2014 | Jeon | ................ | G03B 21/60 359/459 |
| 2014/0092471 A1* | 4/2014 | Sadahiro | ................ | G03B 21/60 359/449 |
| 2014/0204343 A1 | 7/2014 | Choi et al. | | |
| 2014/0247287 A1 | 9/2014 | Saigo | | |
| 2014/0340654 A1 | 11/2014 | Kuwata | | |
| 2015/0237319 A1* | 8/2015 | Tsai | ................ | H04N 9/3188 345/175 |
| 2015/0286124 A1 | 10/2015 | Kim et al. | | |
| 2015/0358574 A1* | 12/2015 | Henion | ................ | A63G 31/00 348/745 |
| 2016/0316184 A1* | 10/2016 | Kim | ................ | H04N 9/3161 |
| 2016/0334697 A1* | 11/2016 | Kim | ................ | G02B 5/0242 |
| 2017/0184953 A1* | 6/2017 | Su | ................ | G02B 17/004 |
| 2017/0242329 A1* | 8/2017 | Chien | ................ | G02B 5/1885 |
| 2017/0285875 A1* | 10/2017 | Hasuike | ................ | G03B 21/2053 |
| 2018/0295333 A1* | 10/2018 | Chiba | ................ | G03B 21/00 |
| 2019/0116356 A1* | 4/2019 | Matoba | ................ | G09G 5/377 |
| 2020/0387061 A1* | 12/2020 | Wang | ................ | G02B 5/0284 |

FOREIGN PATENT DOCUMENTS

| | | |
|---|---|---|
| JP | 2005-134448 | 5/2005 |
| JP | 2013-122492 | 6/2013 |
| JP | 2013-247601 | 12/2013 |
| JP | 2014-142429 | 8/2014 |
| JP | 2014-171030 | 9/2014 |
| JP | 2014-522623 | 9/2014 |
| JP | 2016-009271 | 1/2016 |
| WO | WO 2013/080953 | 6/2013 |

* cited by examiner

IMAGE DISPLAY DEVICE

CROSS REFERENCE TO RELATED APPLICATIONS

This application is a national stage application under 35 U.S.C. 371 and claims the benefit of PCT Application No. PCT/JP2019/009338 having an international filing date of 8 Mar. 2019, which designated the United States, which PCT application claimed the benefit of Japanese Patent Application No. 2018-059503 filed 27 Mar. 2018, the entire disclosures of each of which are incorporated herein by reference.

TECHNICAL FIELD

The present disclosure relates to an image display device.

BACKGROUND ART

An image display system constituted by a plurality of screens and projectors that project images on the corresponding screens is well-known from, for example, Japanese Patent Application Laid-Open No. H11-64975. The image display system disclosed in this patent publication is of a rear projection type, in which an image projected from the projector onto a first side of a screen is viewed from a second side (rear side) of the screen.

CITATION LIST

Patent Document

Patent Document 1: Japanese Patent Application Laid-Open No. H11-64975

SUMMARY OF THE INVENTION

Problems to be Solved by the Invention

Incidentally, in the image display system disclosed in the patent publication described above, in a case of assuming that an image projected from the projector onto the first side of the screen is viewed from the first side of the screen, a problem arises in which not only the image projected from the projector but also a shadow of a viewer is reflected on the first side of the screen. That is, as illustrated in conceptual diagrams in FIGS. 14A, 14B, 15A, and 15B, in a case where an image is projected from a projector 111 onto a screen 123, an image is projected from a projector 112 onto a screen 124, an image is projected from a projector 113 onto a screen 121, and an image is projected from a projector 114 onto a screen 122, a shadow 50' of a viewer 50 is reflected on the screen as illustrated in a conceptual diagram in FIG. 13A. Consequently, there are restrictions on an image viewing position, for example, the image viewing position is limited to a central portion of a space surrounded by the four screens 121, 122, 123, and 124.

It is therefore an object of the present disclosure to provide an image display device that is constituted by a plurality of screens and projectors and has a configuration and a structure with less restrictions on an image viewing position from which a viewer views images projected from the projectors onto the screens.

Solutions to Problems

To achieve the object described above, an image display device of the present disclosure includes M (M≥2) ultra-short focus projectors and reflective directional screens that reflect projection light rays from the corresponding ultra-short focus projectors, in which the ultra-short focus projectors are arranged above or below the directional screens on which the ultra-short focus projectors are supposed to project images, adjacent directional screens are tightly arranged, and the adjacent directional screens are arranged to form an angle of less than 180 degrees.

MODE FOR CARRYING OUT THE INVENTION

Figure 1A:
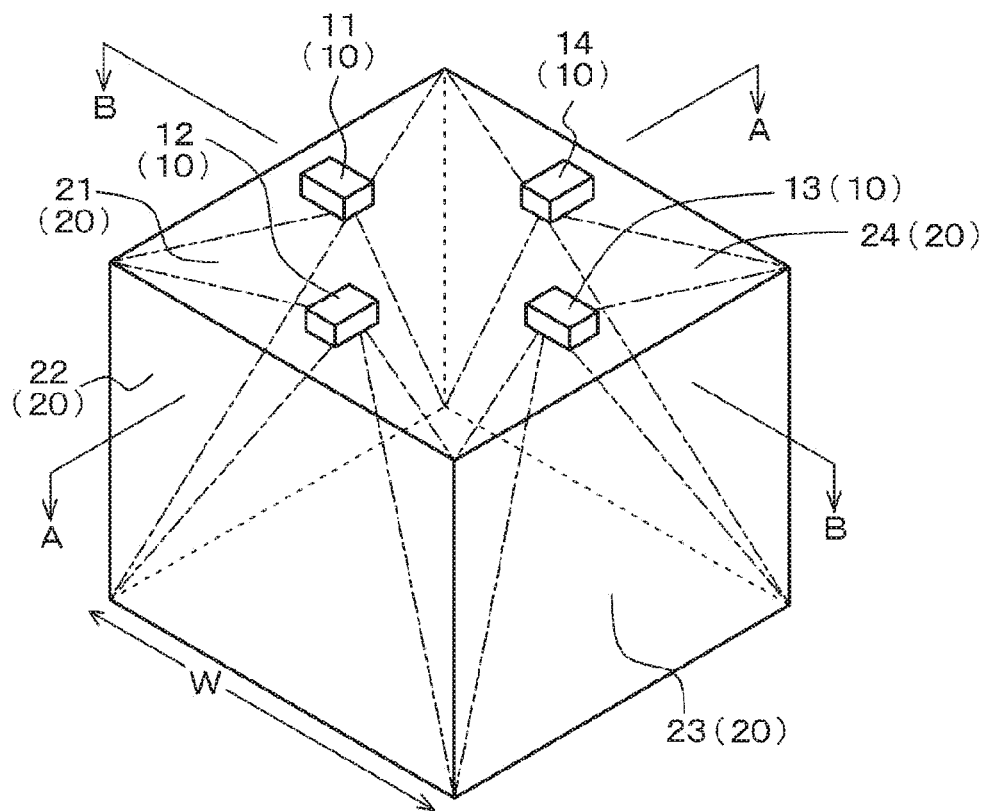
FIGS. 1A and 1B are respectively a conceptual diagram of an image display device of a first embodiment projecting an image, and a conceptual diagram of the image display device illustrating a section of the image display device taken along an arrow B-B in FIG. 1A.

The present disclosure will be described below with reference to the drawings on the basis of embodiments, but the present disclosure is not limited to the embodiments, and various numerical values and materials in the embodiments are examples. Note that the description will be made in the order below.

1. Description in general of image display device of the present disclosure
2. First embodiment (image display device of the present disclosure)
3. Second embodiment (modification of first embodiment)
4. Third embodiment (modification of first embodiment and second embodiment)
5. Others <Description in General of Image Display Device of the Present Disclosure>

In an image display device of the present disclosure, an ultra-short focus projector is arranged above or below a directional screen on which the ultra-short focus projector is supposed to project an image, and this may be expressed as "the ultra-short focus projector is arranged above or below the directional screen" for simplification in the description below.

The image display device of the present disclosure may be in a mode in which the directional screen has a curved surface (or gentle projections and depressions) within a range of a depth of focus of a projection lens included in the ultra-short focus projector. Then, this ensures prevention of a so-called defocus in an image projected on the directional screen.

The image display device of the present disclosure including the preferred modes described above may be in a mode of further including a position detection device that detects a position with respect to the directional screen of an object (including a person) in contact with a light reflecting surface of the directional screen, or an object (including a person) close to the light reflecting surface of the directional screen. The position detection device may have a well-known configuration and structure.

Moreover, the image display device of the present disclosure including the various preferred modes described above may have a configuration in which the directional screen reflects projection light rays from the ultra-short focus projector to cause the projection light rays to travel in parallel to each other and in a predetermined direction. The image display device may have a configuration in which the predetermined direction is a direction normal to the light reflecting surface of the directional screen. Note that the direction of reflection of the projection light rays in a micro region of the directional screen may not exactly match a direction normal to this micro region. Even in such a case, it is described that "the predetermined direction is the direction normal to the light reflecting surface of the directional screen." Then, in the cases of these configurations, the directional screen may have a configuration in which the light reflecting surface has a Fresnel shape in which arc-shaped projections and depressions having a predetermined width are arranged concentrically. Such a Fresnel shape constitutes a kind of a concave mirror (virtual concave mirror). Then, a focal position of the concave mirror corresponds to an optical center of the Fresnel shape described below.

Moreover, in the cases of these configurations, the directional screen may have a configuration in which the light reflecting surface does not include the optical center of the Fresnel shape. Moreover, in these cases, the ultra-short focus projector may have a configuration in which an image emitting unit (projection lens) may be located at the optical center of the Fresnel shape. Since an image emitting unit of the ultra-short focus projector has a finite size, it is sufficient if the image emitting unit includes the optical center of the Fresnel shape. In some cases, the optical center of the Fresnel shape may be located near the image emitting unit. Even in such a case, it is described that "the image emitting unit is located at the optical center of the Fresnel shape." Furthermore, the light reflecting surface of the directional screen does not include the optical center of the Fresnel shape, and this means that an image projected orthogonally to the directional screen from the optical center of the Fresnel shape (specifically, an image projected orthogonally to a first virtual plane described later) is not included in the light reflecting surface of the directional screen.

Moreover, in the preferred configurations described above, a mode is possible in which M' (M'≥3) ultra-short focus projectors and directional screens that display images from the corresponding ultra-short focus projectors are included, and at least two of the M' directional screens are arranged to face each other in parallel. Then, in this case, a mode is possible in which, when projection light rays reflected by a first of the directional screens arranged to face each other in parallel collide with a second directional screen, the projection light rays reflected by the second directional screen do not travel toward the first directional screen.

Moreover, the image display device of the present disclosure including the preferred modes and configurations described above may have a configuration in which an image projected across adjacent directional screens is projected continuously on the adjacent directional screens. In this case, the image projected across the adjacent directional screens may be projected in a state of being enlarged in a horizontal direction. Alternatively, the image display device may have a configuration in which images are projected on the directional screens in a state in which a degree of enlargement in a horizontal direction is greater as a position is closer to a horizontal edge of each directional screen. Note that adjacent directional screens are tightly arranged, but a gap may be left therebetween due to limitations of installing the directional screens or the like in some cases. In this case, an image projected across the adjacent directional screens is projected discontinuously on the adjacent directional screens. Even in such a case, it is described that the image is "projected continuously on the adjacent directional screens."

In the image display device of the present disclosure including the preferred modes and configurations described above, ultra-short focus projectors having a well-known configuration and structure may be used as the ultra-short focus projectors. It is desirable that the ultra-short focus projectors have a throw ratio of 0.38 or less, preferably between 0.1 and 0.35, inclusive, and more preferably between 0.2 and 0.3, inclusive. Here, the throw ratio is represented by "D/W", where "W" is a horizontal width of a projected image (width in a horizontal direction of a directional screen), and "D" is a projection distance. A virtual plane that includes a light reflecting surface of a directional screen is referred to as a "first virtual plane" for convenience sake, and a virtual plane that includes a projection lens of an ultra-short focus projector and is a virtual vertical plane orthogonal to the first virtual plane is referred to as a "second virtual plane" for convenience sake. Then, a projection distance refers to the shortest distance from the projection lens of the ultra-short focus projector to the first virtual plane in the second virtual plane. A typical conventional projector, which is not an ultra-short focus projector, has a throw ratio of 1.1 or more.

The directional screen used may have a well-known configuration and structure. The directional screen may have a nominal size (diagonal length of the directional screen) of, for example, 80 inches to 140 inches. The predetermined width and a height of the arc-shaped projections and depressions constituting the light reflecting surface of the directional screen may be determined in consideration of a radius of curvature of the light reflecting surface that is a kind of a concave mirror (virtual concave mirror) due to the Fresnel shape, a position where the directional screen occupies in the concave mirror, a size of the directional screen, and the like. Specifically, the predetermined width may be, for example, 0.1 mm, but is not limited thereto. The projections and depressions may also be unequally spaced and shaped projections and depressions having characteristics of an aspherical shape for correction of spherical aberration. Here, examples of the aspherical shape may include, for example, an off-axis parabolic shape, that is, a shape obtained by cutting out a paraboloid at a position off the axis of symmetry of the paraboloid. Light that is incident from a focal position of the paraboloid and reflected by the paraboloid becomes parallel light. In a case of a larger directional screen, such an effect of the paraboloid is greater. The adjacent directional screens are arranged to form an angle of less than 180 degrees. A lower limit of this angle, which is not limited, may be 90 degrees, for example.

The ultra-short focus projectors are arranged above (obliquely above) or below (obliquely below) the directional screens. Specifically, it is desirable to arrange the ultra-short focus projectors above or below the directional screens so that a maximum value of angles of incidence of images projected from the ultra-short focus projectors onto the directional screens may be 50 degrees to 85 degrees, preferably 65 degrees to 80 degrees. Here, an angle of incidence refers to an angle, in the second virtual plane, at which light flux constituting an image projected from an ultra-short focus projector is incident onto a directional screen (an angle between a normal to the directional screen and the light flux constituting the image). The ultra-short focus projectors may be attached by, for example, suspending them from the ceiling, embedding them in the ceiling, placing them on the floor, or embedding them in the floor. Furthermore, adjacent directional screens are tightly arranged, but a gap may be left therebetween due to limitations of installing the directional screens or the like in some cases. Even in such a case, it is described that "the adjacent directional screens are tightly arranged." Note that a minimum value of the angles of incidence of images projected from the ultra-short focus projectors onto the directional screens may be 15 degrees to 40 degrees, preferably 20 degrees to 30 degrees.

Values of M and M' are not particularly limited as long as the value of M is 2 or more and the value of M' is 3 or more. Examples of the value of M' include 3, 4, 6, and 8. Examples of a case of M'=4 may include, for example, a mode in which directional screens are arranged along the corresponding sides (for example, walls, room dividers, or partitions) of a square or a rectangle. Examples of a case of M'=6 may include, for example, a mode in which directional screens are arranged along the corresponding sides (for example, walls, room dividers, or partitions) of a regular hexagon. Examples of a case of M'=8 may include, for example, a mode in which directional screens are arranged along the corresponding sides (for example, walls, room dividers, or partitions) of a regular octagon.

First Embodiment

Figure 1B:
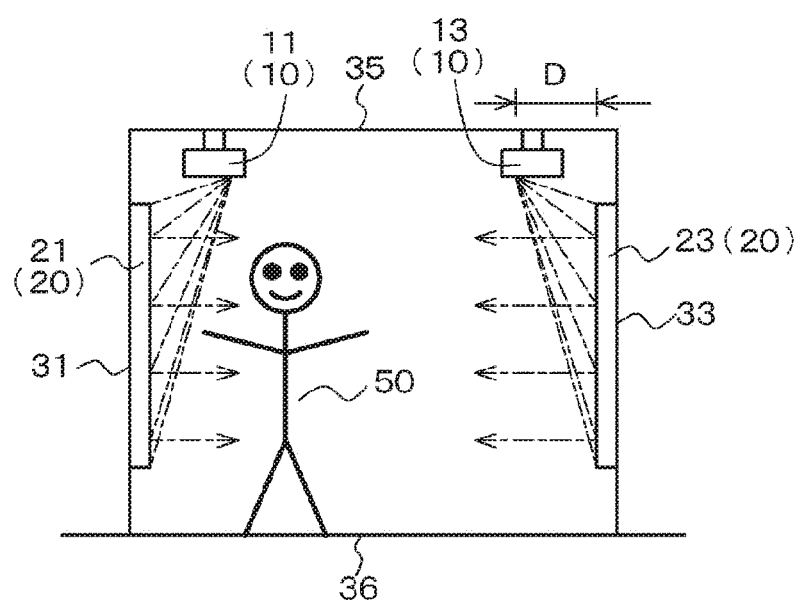
Figure 2A:
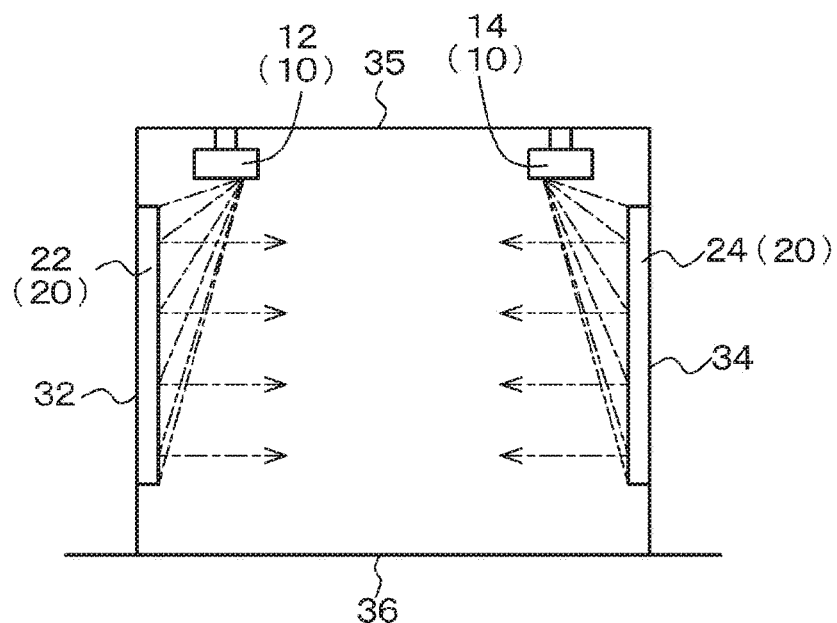
FIGS. 2A and 2B are respectively a conceptual diagram of the image display device illustrating a section of the image display device taken along an arrow A-A in FIG. 1A, and a conceptual diagram of the image display device illustrating the section of the image display device taken along the arrow B-B in FIG. 1A.
Figure 2B:
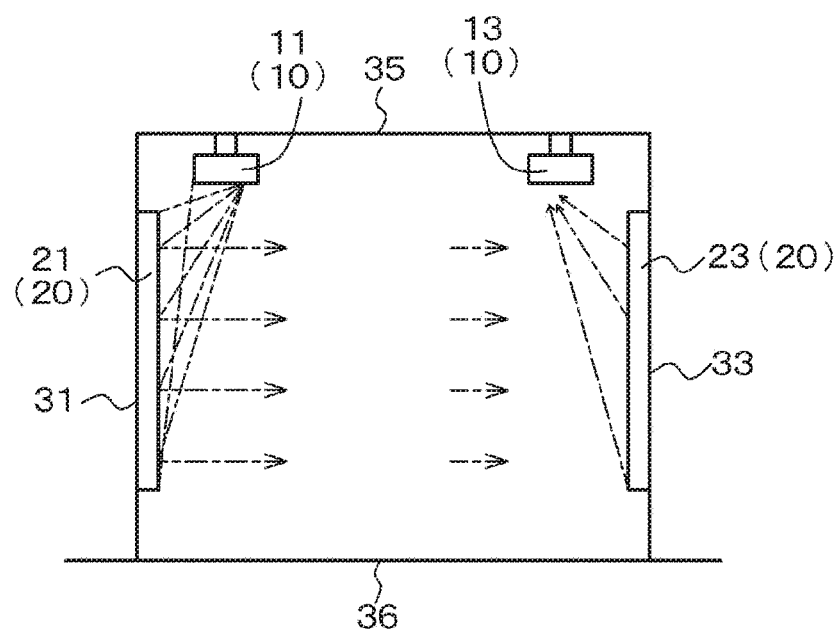
Figure 3A:
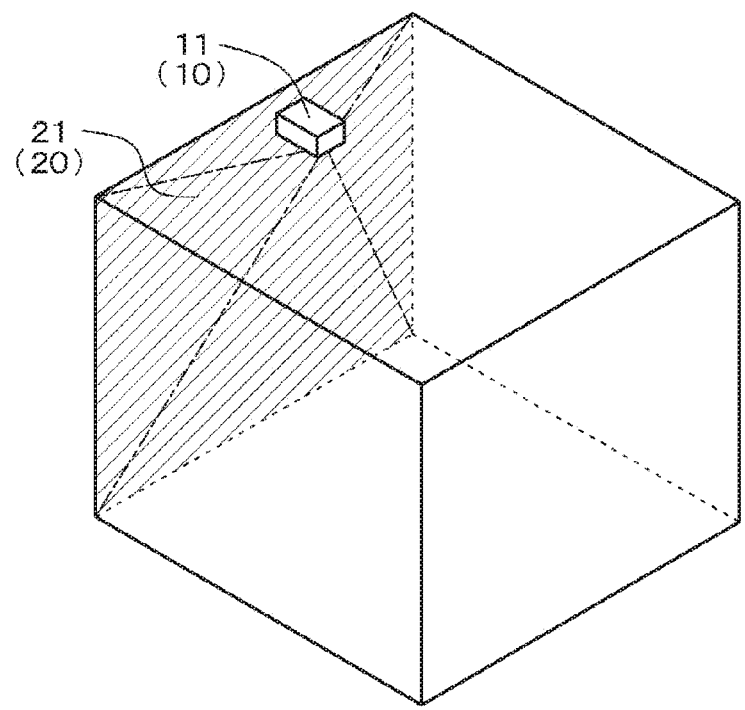
FIGS. 3A and 3B are each a conceptual diagram of the image display device of the first embodiment projecting an image.
Figure 3B:
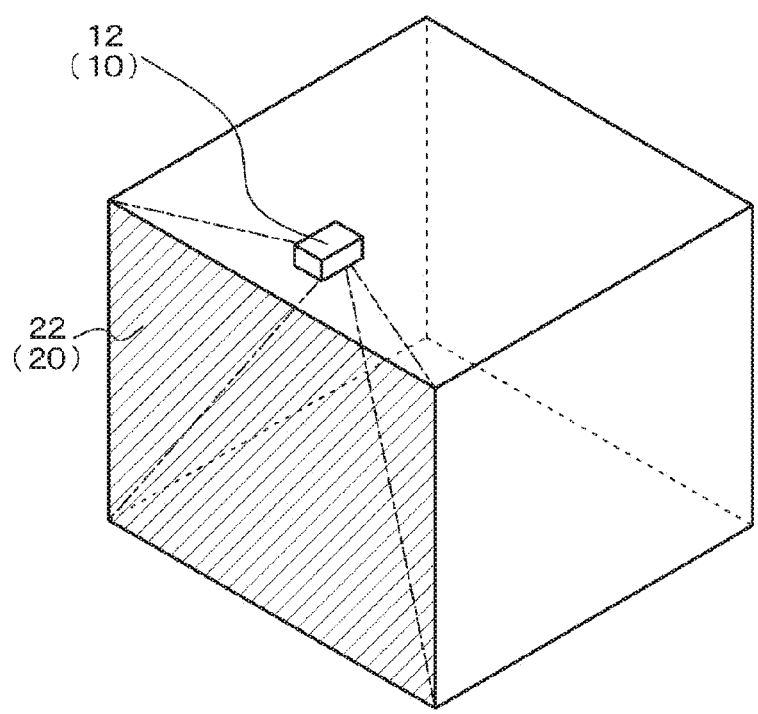
Figure 4A:
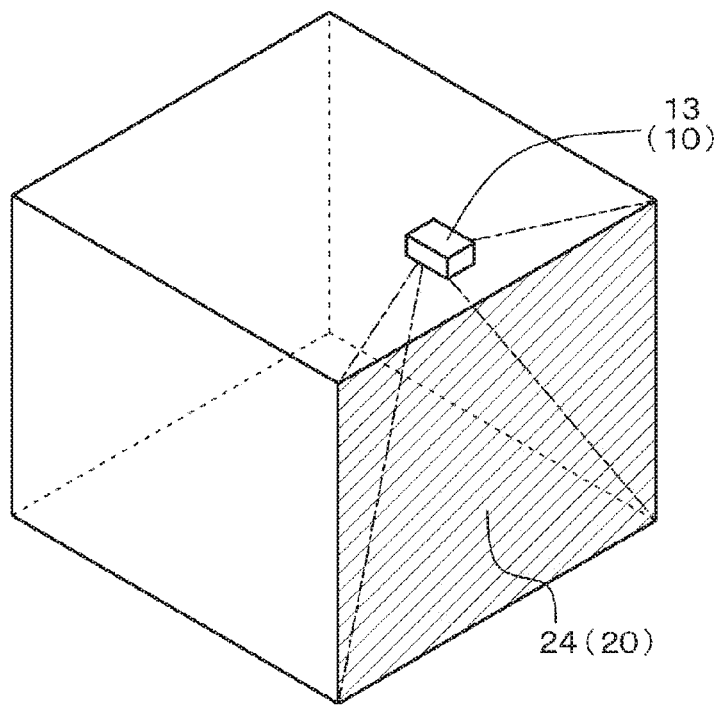
FIGS. 4A and 4B are each a conceptual diagram of the image display device of the first embodiment projecting an image.
Figure 4B:
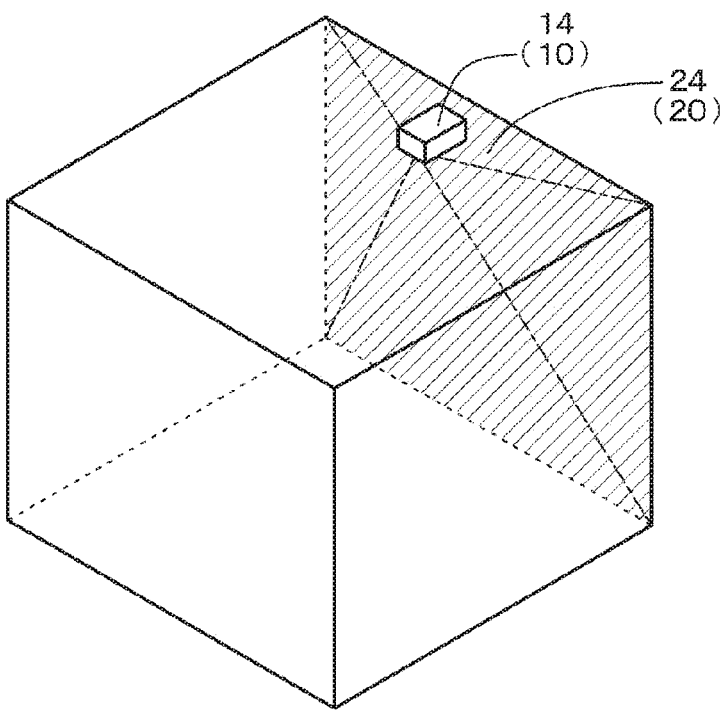
Figure 5A:
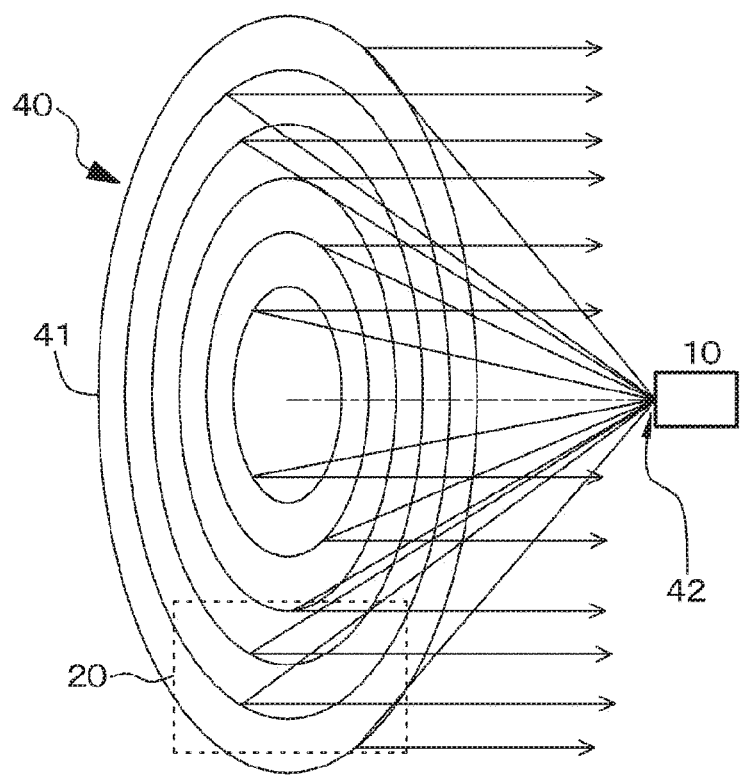
FIGS. 5A and 5B are conceptual diagrams of a directional screen.
Figure 5B:
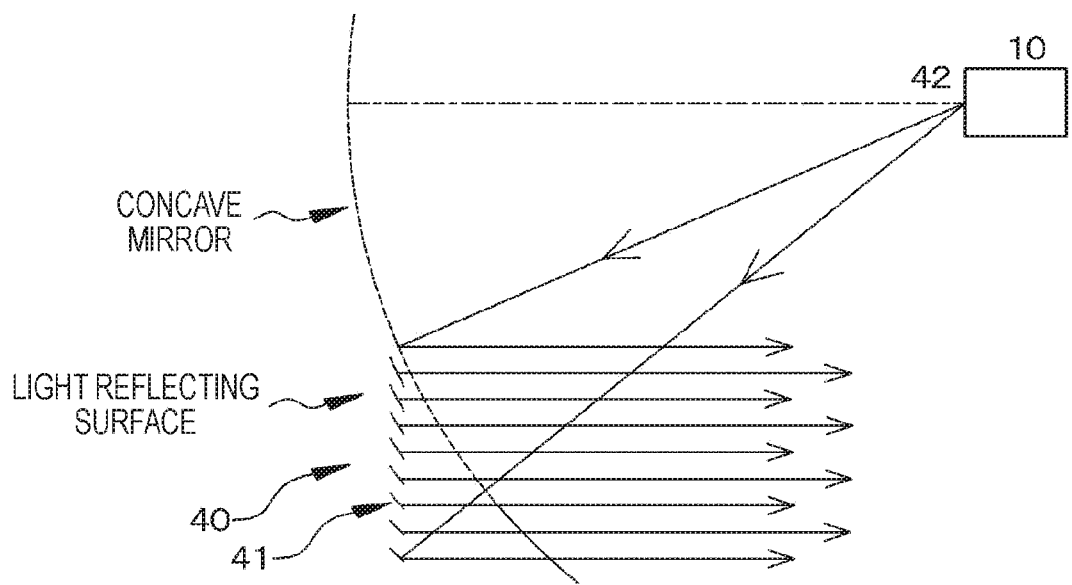

A first embodiment relates to an image display device of the present disclosure. FIGS. 1A, 3A, 3B, 4A, and 4B are conceptual diagrams of the image display device of the first embodiment projecting an image. FIGS. 1B and 2B are conceptual diagrams illustrating the section of the image display device of the first embodiment taken along the arrow B-B in FIG. 1A. FIG. 2A is a conceptual diagram illustrating a section of the image display device of the first embodiment taken along an arrow A-A in FIG. 1A. FIGS. 5A and 5B are conceptual diagrams of a directional screen.

The image display device of the first embodiment includes M (M≥2, and M=4 in the first embodiment) ultra-short focus projectors 11, 12, 13, and 14 (in the description below, they may be collectively referred to as "ultra-short focus projectors 10"), and reflective directional screens 21, 22, 23, and 24 (in the description below, they may be collectively referred to as "directional screens 20") that reflect projection light rays from the corresponding ultra-short focus projectors 10, the ultra-short focus projectors 10 are arranged above (obliquely above) or below (obliquely below) (specifically, in the first embodiment, arranged above (obliquely above)) the directional screens 20 on which the ultra-short focus projectors 10 are supposed to project images (including videos), adjacent directional screens 20 are tightly arranged, and the adjacent directional screens 20 are arranged to form an angle of less than 180 degrees.

Specifically, the ultra-short focus projector 11 is arranged above the directional screen 21, the ultra-short focus projector 12 is arranged above the directional screen 22, the ultra-short focus projector 13 is arranged above the directional screen 23, and the ultra-short focus projector 14 is arranged above the directional screen 24. An image from the ultra-short focus projector 11 is projected on the directional screen 21, an image from the ultra-short focus projector 12 is projected on the directional screen 22, an image from the ultra-short focus projector 13 is projected on the directional screen 23, and an image from the ultra-short focus projector 14 is projected on the directional screen 24.

Furthermore, the directional screen 21 and the directional screen 22 are arranged to form an angle of less than 180 degrees (specifically, 90 degrees), the directional screen 22 and the directional screen 23 are arranged to form an angle of less than 180 degrees (specifically, 90 degrees), the directional screen 23 and the directional screen 24 are arranged to form an angle of less than 180 degrees (specifically, 90 degrees), and the directional screen 24 and the directional screen 21 are arranged to form an angle of less than 180 degrees (specifically, 90 degrees).

Moreover, the directional screen 21 is attached to a wall 31, the directional screen 22 is attached to a wall 32, the directional screen 23 is attached to a wall 33, and the directional screen 24 is attached to a wall 34. The image display device of the first embodiment is installed in a room having a rectangular ceiling 35 and a floor 36. The ultra-short focus projectors 10 are suspended from the ceiling 35. Note that the directional screens 20 may be attached to room dividers (partitions) instead of the walls.

In the image display device of the first embodiment, each of the directional screens 20 has a curved surface (or gentle projections and depressions) within a range of a depth of focus (for example, 14 mm) of a projection lens included in the corresponding ultra-short focus projector 10. This ensures prevention of a so-called defocus in images projected on the directional screens 20.

Furthermore, the image display device of the first embodiment includes M' (M'≥3, and M'=4 in the first embodiment) ultra-short focus projectors 10 and the directional screens 20 on which images from the corresponding ultra-short focus projectors 10 are displayed. Here, at least two of the M' directional screens are arranged to face each other in parallel. Specifically, in the image display device of the first embodiment, the two directional screens 21 and 23 are arranged to face each other in parallel (see FIG. 1B), and the two directional screens 22 and 24 are arranged to face each other in parallel (see FIG. 2A). Then, when projection light rays reflected by a first of the directional screens arranged to face each other in parallel collide with a second directional screen, the projection light rays reflected by the second directional screen do not travel toward the first directional screen (see FIG. 2B).

Specifically, when projection light rays reflected by the directional screen 21, which is a first of the directional screens 21 and 23 arranged to face each other in parallel collide with the directional screen 23, which is a second directional screen, the projection light rays reflected by the directional screen 23, which is the second directional screen, do not travel toward the directional screen 21, which is the first directional screen, the directional screens 22 and 24, the ceiling 35, or the floor 36 (see FIG. 2B). When projection light rays reflected by the directional screen 23, which is a first of the directional screens 21 and 23 arranged to face each other in parallel collide with the directional screen 21, which is a second directional screen, the projection light rays reflected by the directional screen 21, which is the second directional screen, do not travel toward the directional screen 23, which is the first directional screen, the directional screens 22 and 24, the ceiling 35, or the floor 36. In a similar manner, when projection light rays reflected by the directional screen 22, which is a first of the directional screens 22 and 24 arranged to face each other in parallel collide with the directional screen 24, which is a second directional screen, the projection light rays reflected by the directional screen 24, which is the second directional screen, do not travel toward the directional screen 22, which is the first directional screen, the directional screens 21 and 23, the ceiling 35, or the floor 36. When projection light rays reflected by the directional screen 22, which is a first of the directional screens 22 and 24 arranged to face each other in parallel collide with the directional screen 24, which is a second directional screen, the projection light rays reflected by the directional screen 24, which is the second directional screen, do not travel toward the directional screen 22, which is the first directional screen, the directional screens 21 and 23, the ceiling 35, or the floor 36. In this way, when projection light rays reflected by a first directional screen collide with a second directional screen, the projection light rays reflected by the second directional screen do not travel toward the first directional screen, that is, toward a viewer 50. This ensures prevention of a deterioration of image quality such as a decrease in image contrast or a deterioration of image resolution.

In the image display device of the first embodiment, each of the directional screens 20 reflects projection light rays from the corresponding ultra-short focus projector 10 to cause the projection light rays to travel in parallel to each other and in a predetermined direction (specifically, a direction normal to a light reflecting surface of the directional screen 20). The light reflecting surface of the directional screen 20 has, for example, a structure constituted by a combination of a layer having a diffusion property and a Fresnel shape 40 in which arc-shaped projections and depressions having a predetermined width are arranged concentrically. Specifically, the predetermined width of arc-shaped projections and depressions 41 constituting the light reflecting surface of the directional screen 20 may be, for example, 0.1 mm. The Fresnel shape 40 constitutes a kind of a concave mirror (virtual concave mirror), and a focal position of the concave mirror corresponds to an optical center 42 of the Fresnel shape 40. A straight line extending from the center of the concave mirror to the optical center 42 is illustrated by a long dashed short dashed line in FIGS. 5A and 5B. Furthermore, FIG. 5B illustrates a virtual concave mirror and the light reflecting surface of the Fresnel shape 40. In this way, in a case where an image emitting unit (projection lens) of the ultra-short focus projector 10 is arranged at the optical center 42 of the Fresnel shape 40, when light emitted from the ultra-short focus projector 10 collides with the directional screen 20, the light is reflected in a predetermined direction (specifically, the direction normal to the light reflecting surface of the directional screen 20). In FIG. 5A, the directional screen 20 is indicated by a dotted line, and the light reflecting surface of the directional screen 20 does not include the optical center 42 of the Fresnel shape 40. The directional screen 20 itself may have a well-known configuration and structure (for example, see Japanese Patent Application Laid-Open No. 2005-134448).

The ultra-short focus projector 10 may have a well-known configuration and structure. Here, the ultra-short focus projector 10 used has a throw ratio (D/W) of 0.38 or less, preferably between 0.1 and 0.35, inclusive, and more preferably between 0.2 and 0.3, inclusive. For example, in a case where the nominal size of the directional screen 20 is 100 inches (2.22 m in width), 120 inches ((2.66 m in width), or 140 inches ((3.1 m in width), the directional screen 20 can be used at a projection distance of 0.63 m, 0.73 m, or 0.71 m, respectively. In these cases, the throw ratio is 0.28, 0.27, or 0.23, respectively. Furthermore, the ultra-short focus projector 10 is arranged above the directional screen 20. Specifically, the ultra-short focus projector 10 is arranged above the directional screen 20 so that a maximum value of an angle of incidence of an image projected from the ultra-short focus projector 10 onto the directional screen 20 is, for example, 76 degrees, and a minimum value is, for example, 20 degrees. As will be described later, also in a case where the ultra-short focus projector 10 is arranged below the directional screen 20, the maximum value and the minimum value may be similar values. However, the arrangement is not limited to such an arrangement state.

Then, an image projected across adjacent directional screens 20 is projected continuously on the adjacent directional screens 20.

Figure 13A:
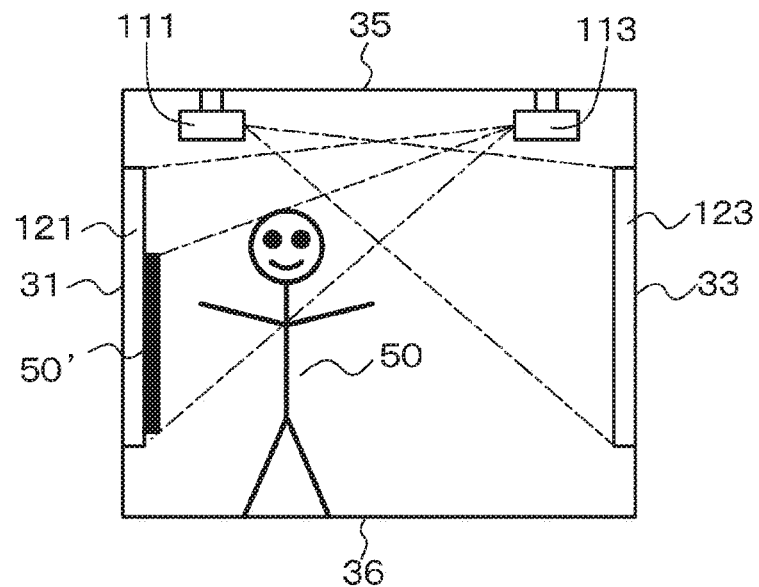
FIGS. 13A and 13B are each a conceptual diagram of a conventional image display device, similar to the section of the image display device taken along the arrow A-A in FIG. 1A.
Figure 13B:
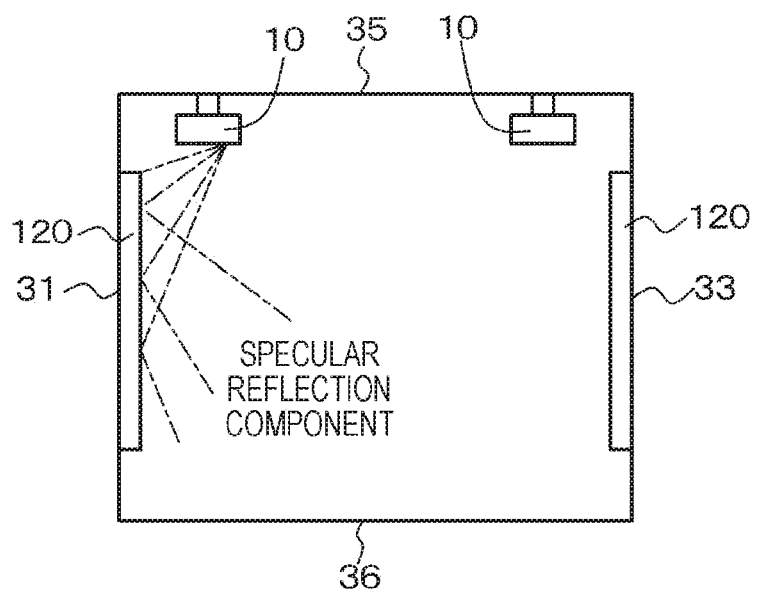
Figure 14A:
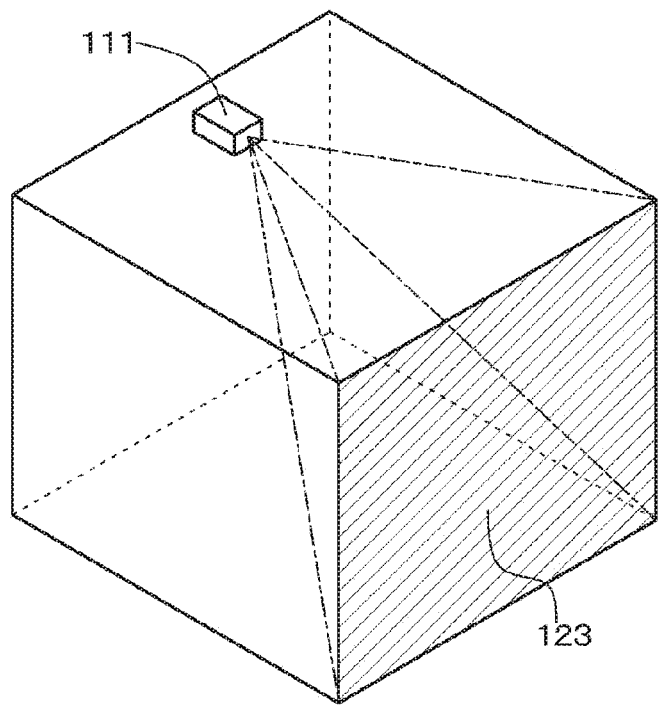
FIGS. 14A and 14B are each a conceptual diagram of the conventional image display device projecting an image.
Figure 14B:
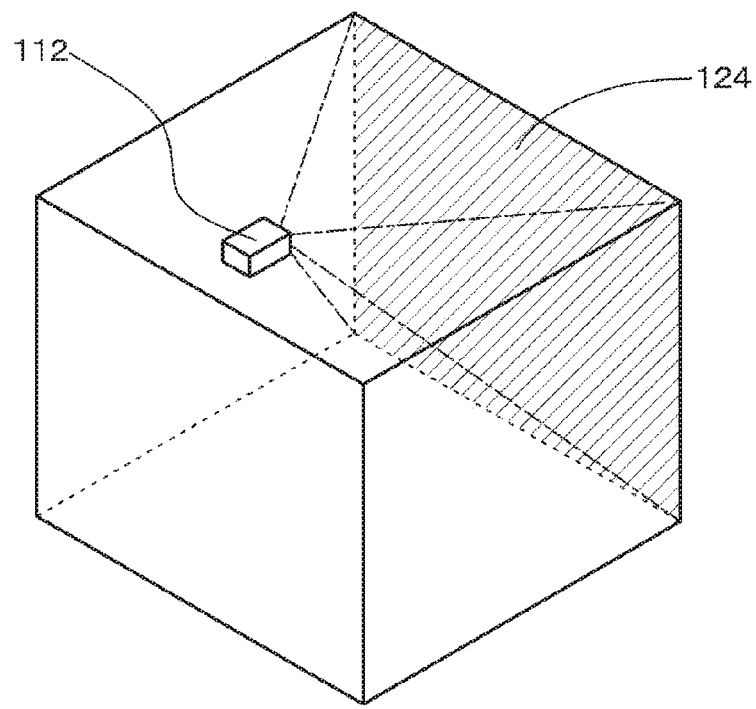
Figure 15A:
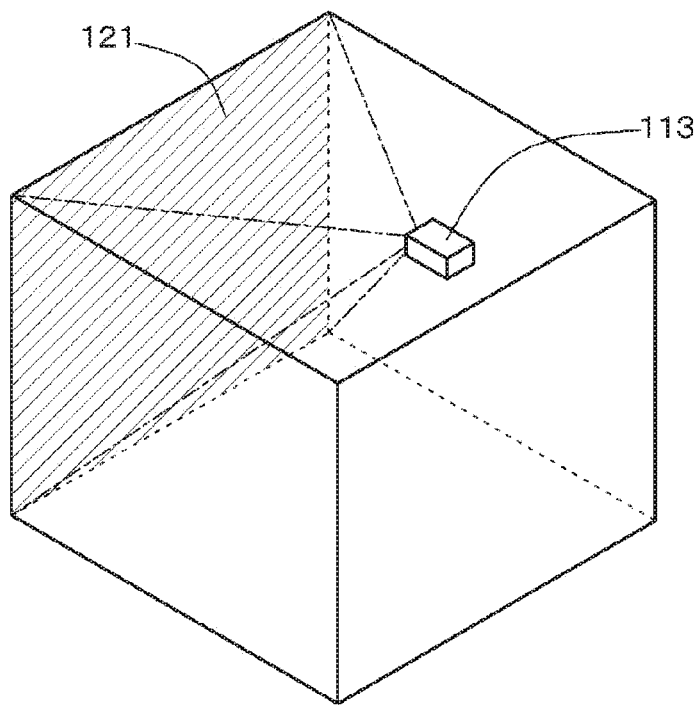
FIGS. 15A and 15B are each a conceptual diagram of the conventional image display device projecting an image.
Figure 15B:
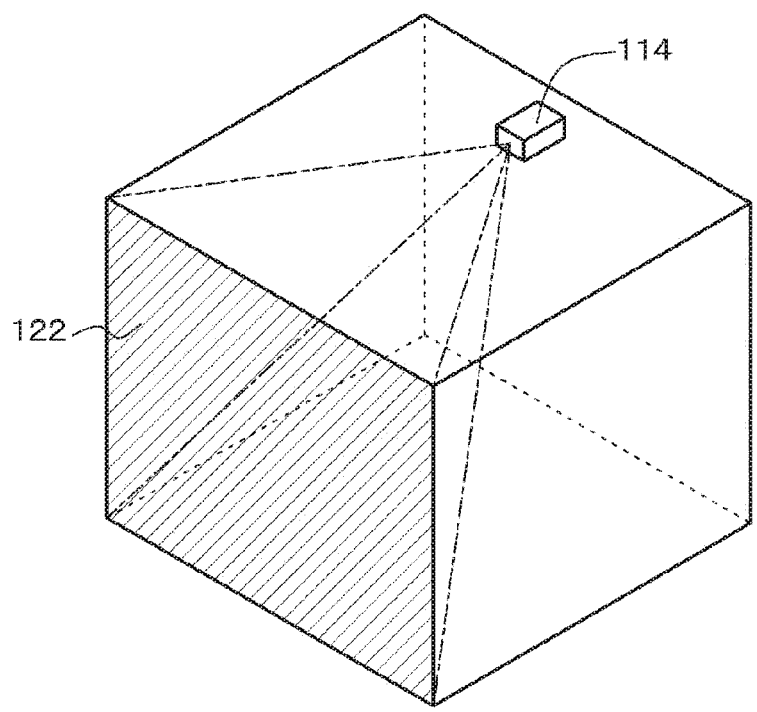

In a case where a projector screen having a typical scattering characteristic, for example, a scattering distribution characteristic such as Lambertian (hereinafter referred to as a "normal screen" for convenience sake) is used, all projected light rays cannot be scattered on the screen surface toward a viewer, an amount of light that reaches the viewer decreases, an image is likely to become dark, and brightness of the image is likely to become uneven. Moreover, in a case of such normal screens 120, even if ultra-short focus projectors are used, there is a considerable amount of specular reflection light component, and such specular reflection light becomes a stray light component (see FIG. 13B). Then, in a case where the normal screens 120 are arranged adjacent to each other at an angle of less than 180 degrees, this specular reflection light irradiates the adjacent normal screens 120, and this causes a deterioration of image quality such as a decrease in image contrast or a deterioration of image resolution. As a result, there arises a problem in that the original image quality of the projectors cannot be obtained. Specifically, for example, there is a case where a bright sunny image of high brightness is projected on a certain normal screen, and at the same time, a dark shady image of low brightness is projected on an adjacent normal screen. Then, in such a case, specular reflection light from the certain normal screen on which the bright image is projected is incident on the adjacent normal screen. This causes a decrease in resolution and contrast of the image on the adjacent normal screen, and the originally dark image becomes bright and deteriorates, which reduces realistic feeling and immersive feeling. Furthermore, a similar phenomenon may occur also in a case of a pair of normal screens arranged to face each other. That is, light reflected from a first normal screen is incident on a second normal screen, and this causes a decrease in image contrast.

On the other hand, as schematically illustrated in FIGS. 1B and 2A, the image display device of the first embodiment uses the ultra-short focus projectors 10. This ensures that a shadow of a viewer 50 is not reflected in images projected on the directional screens 20 from the ultra-short focus projectors 10, so the viewer 50 does not need to be at a specific position to view the images. This allows a high degree of freedom for an image viewing position, and the image display device requires only a small installation space. Moreover, images are projected on the directional screens 20, and this not only ensures that the viewer 50 can view the projected images, but also reduces scattered light components on the light reflecting surfaces of the directional screens 20 screens. As a result, it is possible to prevent a decrease in the amount of light of the images that reaches the viewer 50. Furthermore, it is possible to prevent generation of specular reflection light components in the directional screens 20 (see FIG. 13B) and generation of stray light, it is possible to prevent such light from being incident on another directional screen, it is possible to prevent reflection from an adjacent directional screen, and light reflected from directional screens facing each other is not reflected in a direction toward a viewer. It is therefore possible to prevent non-uniformity and unevenness in brightness of images, and it is possible to ensure prevention of a deterioration of image quality such as a decrease in image contrast or a deterioration of image resolution, without reducing realistic feeling or immersive feeling. As a result, it is possible to project an image with high resolution called "4K" or "8K", and a high dynamic range called HDR (gradation expression of brightness) with a high realistic feeling and immersive feeling. That is, the ultra-short focus projectors 10 and the directional screens 20 are combined and arranged so as to surround the viewer 50, and this allows a high realistic feeling and immersive feeling to be obtained by high resolution and high dynamic range images. Moreover, it is possible to achieve a system configuration that enables the arrangement in a small space.

As described above, the image display device of the first embodiment (image display system) includes a plurality of ultra-short focus projectors and directional screens. The ultra-short focus projectors are arranged above (obliquely above), or below in some cases, the directional screens on which the ultra-short focus projectors are supposed to project images. This ensures that a viewer's shadow is not reflected in the images projected on the directional screens from the ultra-short focus projectors, and there are less restrictions on the viewer's image viewing position. Moreover, images are projected on the directional screens, and this not only ensures that the viewer can view the projected images, but also ensures prevention of a deterioration of image quality such as a decrease in image contrast or a deterioration of image resolution. It is therefore possible for a larger number of viewers to view an image at the same time with no restrictions on the image viewing position.

Second Embodiment

A second embodiment is a modification of the first embodiment. As illustrated in a conceptual diagram in FIG. 6, an image display device of the second embodiment further includes a position detection device that detects a position, with respect to a directional screen 20, of an object (including a person) in contact with a light reflecting surface of the directional screen 20, or an object (including a person) close to the light reflecting surface of the directional screen 20. That is, the image display device of the second embodiment has a user interface function. The position detection device may have a well-known configuration and structure.

Figure 6:
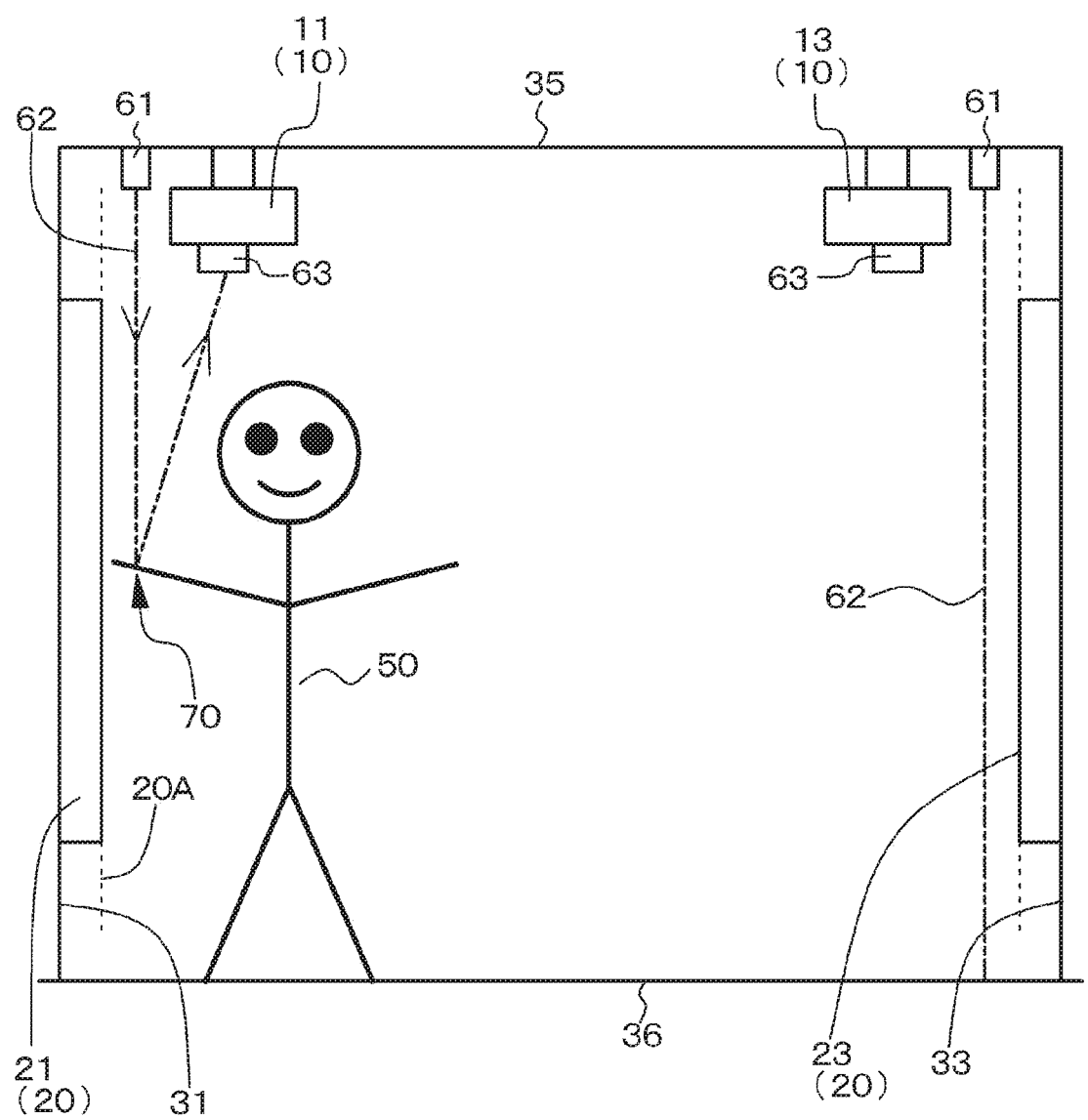
FIG. 6 is a conceptual diagram of an image display device of a second embodiment similar to the section of the image display device taken along the arrow B-B in FIG. 1A.

Specifically, an infrared light emitting device 61 is arranged above the directional screen 20 and in proximity to a first virtual plane 20A (indicated by a dotted line in FIG. 6). On the other hand, an infrared light receiving device 63 is arranged in proximity to the first virtual plane 20A. Specifically, the infrared light emitting device 61 may be arranged at a ceiling 35, and the infrared light receiving device 63 may be arranged at an appropriate place (for example, on a surface located at an appropriate position of an ultra-short focus projector 10). The infrared light emitting device 61 may be a semiconductor laser element, and the infrared light receiving device 63 may be an infrared camera.

An infrared barrier 62 (indicated by a chain double-dashed line in FIG. 6) is formed in a region, for example, several millimeters to several tens of millimeters away from the light reflecting surface of the directional screen 20. That is, the infrared light emitting device 61 and the infrared light receiving device 63 are arranged so that infrared light emitted from the infrared light emitting device 61 passes through a region, for example, several millimeters to several tens of millimeters away from the light reflecting surface of the directional screen 20, and the infrared light reflected by an object 70 is received by the infrared light receiving device 63. The infrared light emitted from the infrared light emitting device 61 constitutes a kind of the infrared barrier 62. In a case where the object 70 such as an interrupting object, a finger, or a pointing stick does not exist, the infrared barrier 62 does not reach the infrared light receiving device 63 because the infrared barrier 62 travels straight without being interrupted by the object 70 (see a state on the right side of FIG. 6). On the other hand, when the object 70 approaches as close as, for example, several millimeters to several tens of millimeters from the light reflecting surface of the directional screen 20 where the infrared barrier is formed, or when the object 70 comes into contact with the light reflecting surface, infrared light emitted from the infrared light emitting device 61 is diffused (scattered) and incident on the infrared light receiving device 63 (see a state on the left side of FIG. 6). Then, the position of the object 70 with respect to the directional screen 20 can be specified by performing image analysis on the basis of the infrared light that has been incident on the infrared light receiving device 63. That is, a viewer 50 can give a direct instruction on the basis of an image displayed on the directional screen 20, for example.

Third Embodiment

A third embodiment is a modification of the first embodiment and the second embodiment. An image projected across adjacent directional screens 20 is projected continuously on the adjacent directional screens 20, and the image projected across the adjacent directional screens 20 is projected in a state of being enlarged in a horizontal direction. Alternatively, images are projected on the directional screens 20 in a state in which a degree of enlargement in a horizontal direction is greater as a position is closer to a horizontal edge of each directional screen 20.

Figure 7:
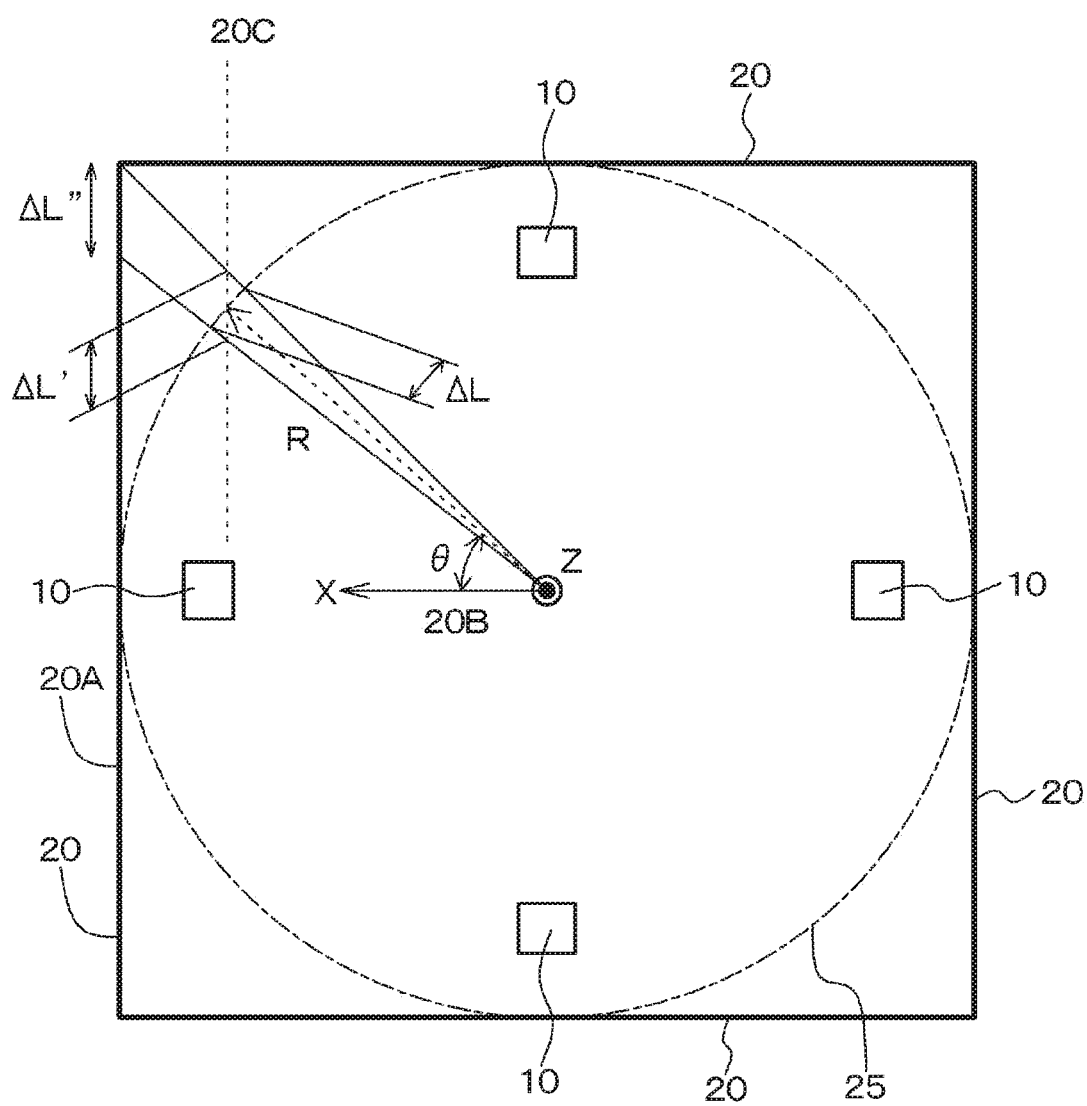
FIG. 7 is a conceptual diagram of a directional screen and the like in an image display device of a third embodiment on the assumption that an image is projected on a virtual cylindrical screen having a radius "R".

A case is assumed in which, as illustrated in a conceptual diagram in FIG. 7, an image is set to be projected from ultra-short focus projectors 10 onto a virtual cylindrical screen 25 having a radius "R" (indicated by a long dashed short dashed line in FIG. 7, with its center referred to as a Z axis). In such a case, the image projected on the directional screens 20 becomes unnatural unless the image is projected in a state in which the closer a position is to a horizontal edge of each directional screen 20, the greater a degree of enlargement in a horizontal direction is.

Here, when an image in a micro region that makes an angle θ with an X axis illustrated in FIG. 7 is projected on the virtual cylindrical screen 25, a length of the image in a horizontal direction is expressed as ΔL. Then, when the image having the length ΔL is projected on a third virtual plane 20C that is parallel to the corresponding directional screen 20 and passes through an intersection of the center of the image having the length ΔL and the center of the micro region passing through the center of the virtual cylindrical screen 25 (illustrated by a broken line in FIG. 7), a length ΔL' of the image is expressed as follows.

$$\Delta L' = \Delta L / \cos(\theta) \quad (A)$$

When the image having the length ΔL' is projected on the directional screen 20, a length of the image is expressed as ΔL", and their relationship is expressed by the following formula:

$$\Delta L'' = \Delta L' / \cos(e) \quad (B)$$

Consequently, $$\Delta L'' = \Delta L / \cos^2(\theta) \quad (C)$$

is obtained.

As described above, when it is assumed that images from the ultra-short focus projectors 10 are projected onto the virtual cylindrical screen 25, the images projected on the actual directional screens 20 may be projected with a degree of enlargement in a horizontal direction greater in a horizontal direction on the basis of Formula (C). That is, assuming a horizontal plane orthogonal to a second virtual plane 20B, a line of intersection between the second virtual plane 20B and the horizontal plane is expressed as the X axis, and an angle between the X axis and a horizontal edge of the directional screen is expressed as θ. Then, image processing on the images from the ultra-short focus projectors 10 may be performed on the basis of Formula (C). Then, this makes it possible to obtain a projected image with less distortion. Note that the second virtual plane 20B is represented by an XZ plane in FIG. 7, and a first virtual plane 20A and the third virtual plane 20C are represented by planes parallel to an XY plane in FIG. 7.

That is, in a case where an omnidirectional image, an image (including a video) by a wide-angle camera, or the like edited for a cylindrical screen is projected on directional screens in an image display device of the third embodiment, signal conversion or image processing is performed to give appropriate distortion (correction) to horizontal coordinates of the image to be projected on the directional screens so that, at around joints between a plurality of the directional screens, the projected image is displayed seamlessly without producing a feeling of strangeness. In the image display device of the third embodiment, a plurality of planar directional screens having a simple structure may be used without installing a cylindrical screen, so an omnidirectional image, an image by a wide-angle camera, or the like can be viewed with the image display device of the third embodiment having a simple configuration and structure.

Figure 8A:
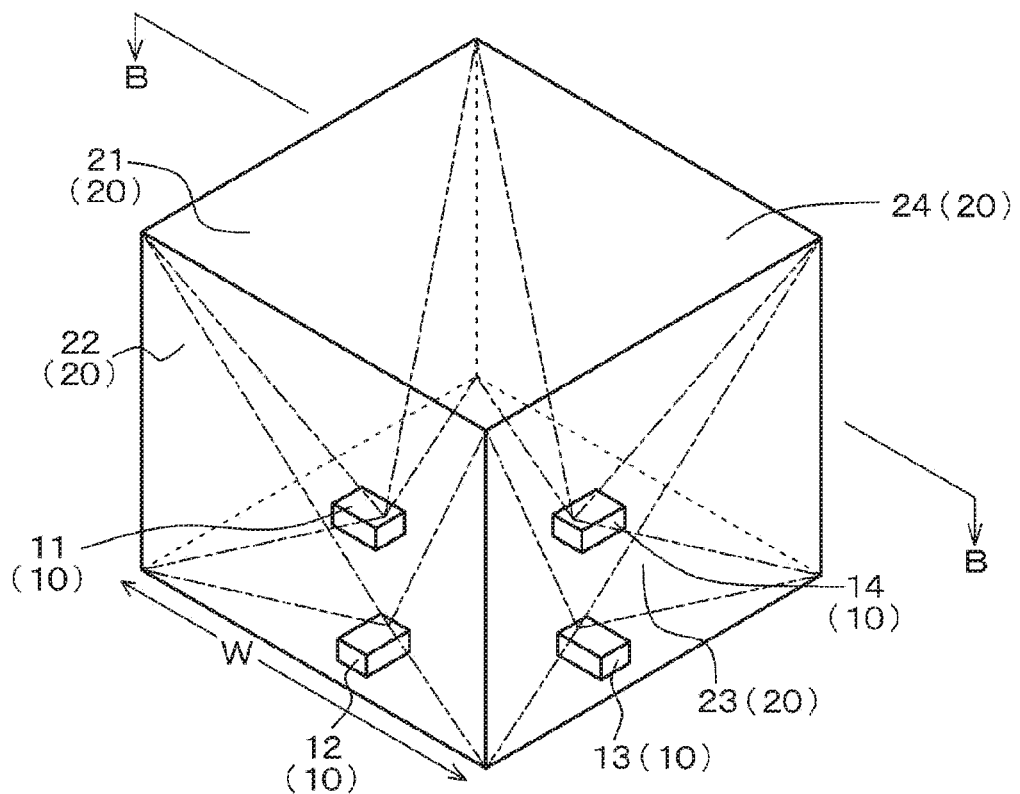
FIGS. 8A and 8B are respectively a conceptual diagram of a modified example of the image display device of the first embodiment projecting an image, and a conceptual diagram of the image display device illustrating a section of the modified example of the image display device of the first embodiment taken along an arrow B-B in FIG. 8A.
Figure 8B:
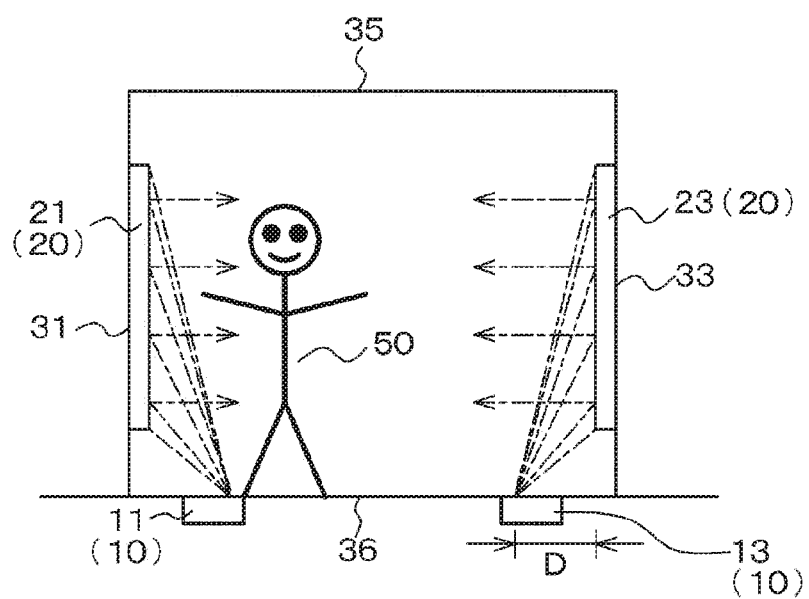

Although the image display device of the present disclosure has been described above on the basis of the preferred embodiments, the image display device of the present disclosure is not limited to these embodiments. In the embodiments, the ultra-short focus projectors are arranged above the directional screens on which the ultra-short focus projectors are supposed to project images. However, as illustrated in FIGS. 8A and 8B, a configuration may be used in which the ultra-short focus projectors are arranged below (obliquely below) the directional screens on which the ultra-short focus projectors are supposed to project images.

Figure 9A:
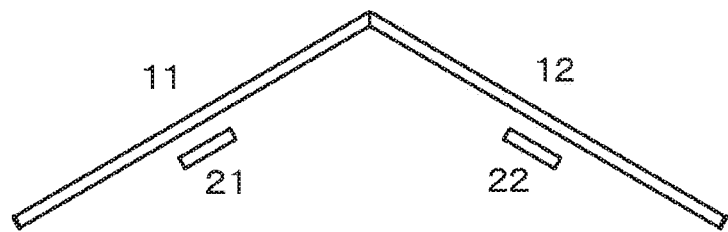
FIGS. 9A, 9B, and 9C are schematic diagrams of the directional screens arranged in a form of a folding screen viewed from above.
Figure 9B:
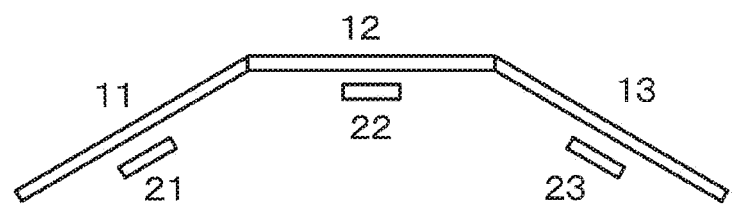
Figure 9C:
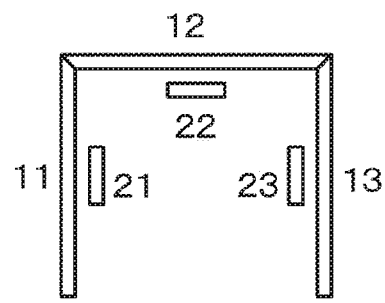

The value of M' is not limited to "4". In a case of M'=6, for example, the directional screens 20 are arranged along the corresponding sides (for example, walls or room dividers) of a regular hexagon. In a case of M'=8, for example, the directional screens 20 are arranged along the corresponding sides (for example, walls or room dividers) of a regular octagon. As illustrated in conceptual diagrams in FIGS. 9A, 9B, and 9C, the directional screens 20 may be arranged in a form of a folding screen. In these cases as well, adjacent directional screens are arranged to form an angle of less than 180 degrees. In some cases, the image display device may have a configuration in which three directional screens are arranged so as to surround a viewer. That is, in a case of M'=3, the image display device may be installed in a room having a triangular shape in a plan view.

For example, it is possible to sequentially perform an operation of projecting an image on a directional screen 21 while stopping projection of images or projecting dark images on other directional screens, and then switching to projecting an image on a directional screen 22 while stopping projection of images or projecting dark images on other directional screens. This allows a viewer to view images sequentially projected on the directional screen 21, the directional screen 22, a directional screen 23, and a directional screen 24 in time series. Alternatively, a line of sight of a viewer may be detected on the basis of a well-known line-of-sight detection technology, and on the basis of a result of the detection, an image may be projected on a directional screen toward which the line of sight of the viewer is directed, and projection of images on other directional screens may be stopped or dark images may be projected on the other directional screens.

Furthermore, the embodiments show a mode in which the light reflecting surface of the directional screen has a Fresnel shape in which arc-shaped projections and depressions having a predetermined width are arranged concentrically, but a mode is also possible in which the light reflecting surface has a Fresnel shape in which elliptical arc-shaped projections and depressions having a predetermined width are arranged concentrically. Then, in this case, the ultra-short focus projector may be arranged at a first focus of the elliptical arc-shaped projections and depressions, and a viewer may be at a position of a second focus of the elliptical arc-shaped projections and depressions. Projection light rays projected from the ultra-short focus projector and reflected by the directional screen converge toward the viewer. Then, when the projection light rays reflected by such a directional screen are incident on another directional screen, the projection light rays are reflected by still another directional screen in a direction other than a direction toward the viewer. Images may be viewed from a position such as substantially in front of a directional screen, for example. That is, a mode is possible in which the directional screen reflects projection light rays from the ultra-short focus projector to cause the projection light rays to travel as converging light in a predetermined direction. In this case, the predetermined direction may be a direction toward a position where the viewer views the directional screen. Moreover, in these modes, the directional screen may have a configuration in which the light reflecting surface has a Fresnel shape in which elliptical arc-shaped projections and depressions having a predetermined width are arranged concentrically. In this case, the light reflecting surface of the directional screen may not include the optical center of the Fresnel shape. Moreover, in these configurations, the ultra-short focus projector may have an image emitting unit located at the optical center of the Fresnel shape. Here, one of focuses of the elliptical arc-shaped projections and depressions corresponds to the optical center of the Fresnel shape.

Figure 10A:
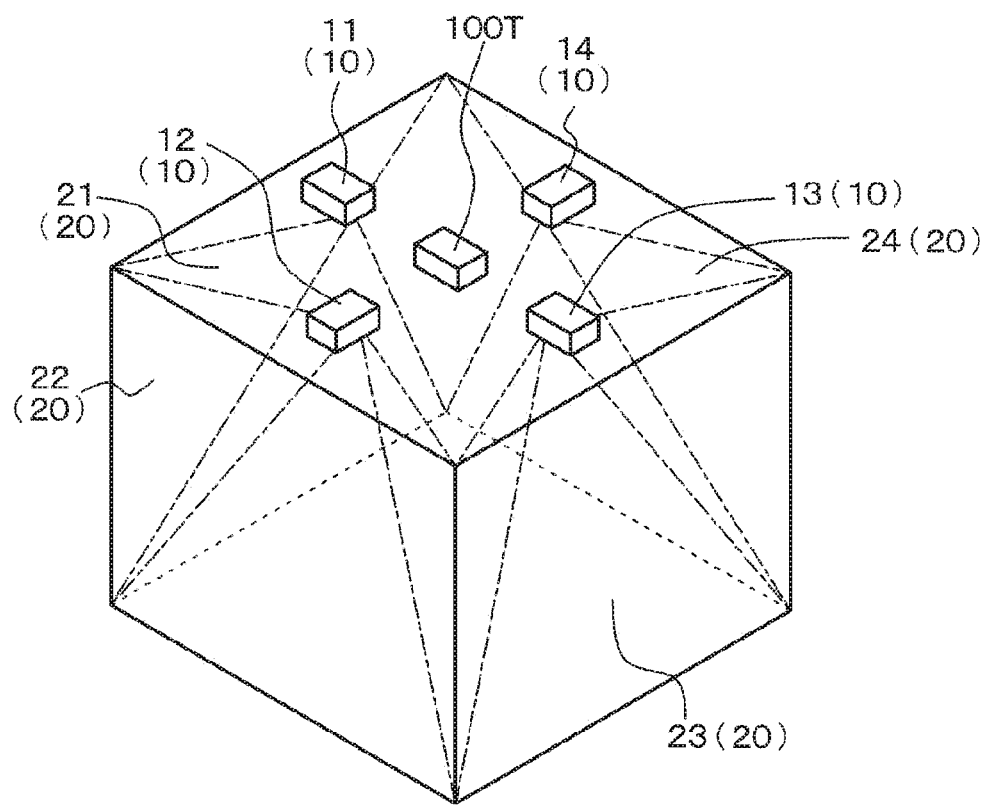
FIGS. 10A and 10B are respectively a conceptual diagram similar to FIG. 1A, and a conceptual diagram of the image display device similar to the section of the image display device taken along the arrow B-B in FIG. 1A, illustrating a combination of the image display device of the present disclosure and a configuration in which a typical conventional projector with a throw ratio of 1.1 or more is arranged at a ceiling to project an image on a floor.
Figure 10B:
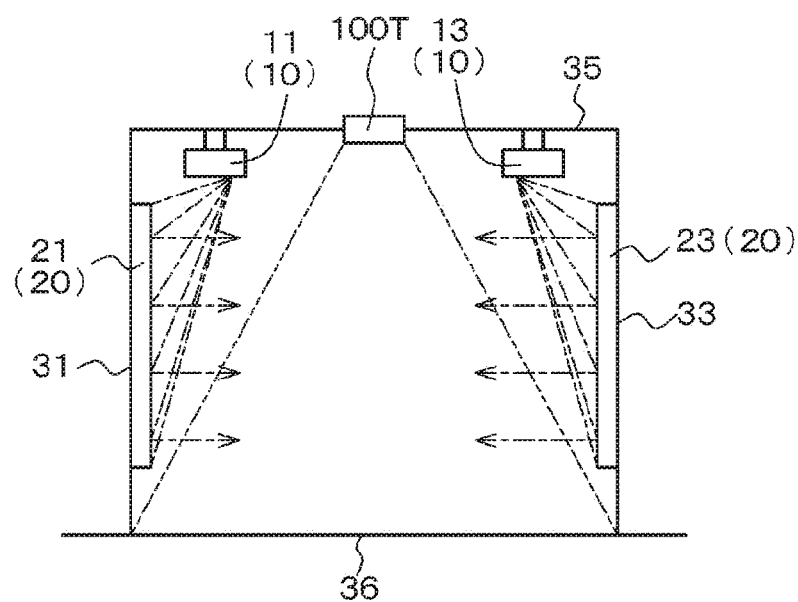
Figure 11A:
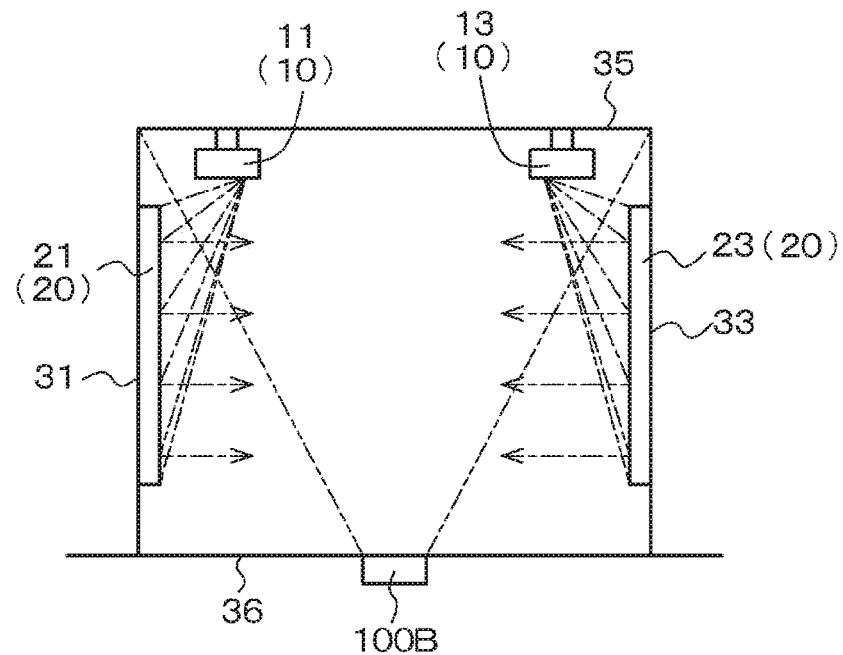
FIGS. 11A and 11B are conceptual diagrams of the image display device similar to the section of the image display device taken along the arrow B-B in FIG. 1A, illustrating a combination of the image display device of the present disclosure and a configuration in which a typical conventional projector with a throw ratio of 1.1 or more is arranged at the ceiling or at the ceiling and the floor to project an image on the floor or on the floor and the ceiling.
Figure 11B:
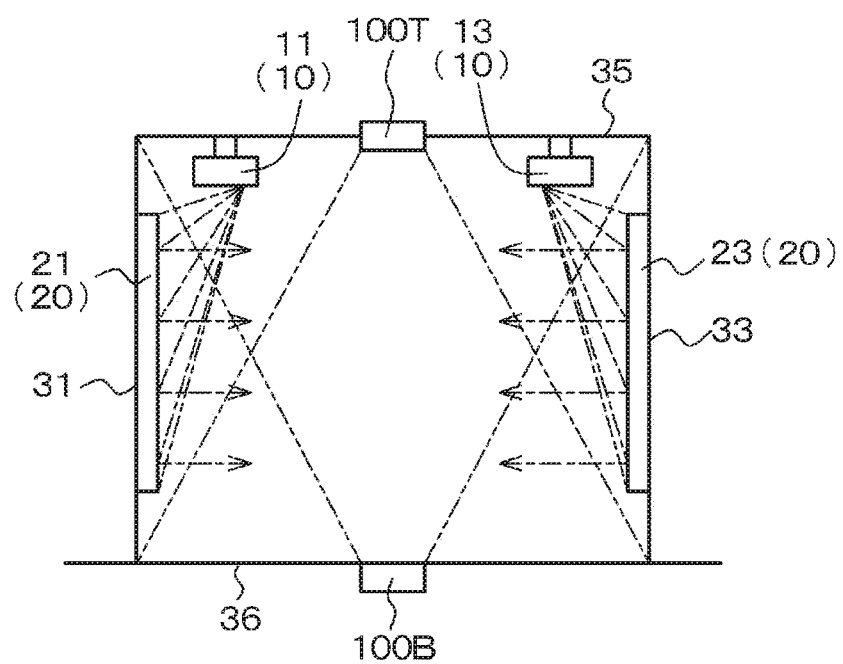

Furthermore, as illustrated in FIGS. 10A and 10B, the image display device of the present disclosure may be combined with a configuration in which a typical conventional projector 100T with a throw ratio of 1.1 or more is arranged at a ceiling 35 to project an image on a floor 36. Here, FIG. 10B, and FIGS. 11A, 11B, and 12B described later are conceptual diagrams of the image display device similar to the section of the image display device taken along the arrow B-B in FIG. 1A. Alternatively, as illustrated in FIG. 11A, the image display device of the present disclosure may be combined with a configuration in which a typical conventional projector 100B with a throw ratio of 1.1 or more is arranged at the floor 36 to project an image on the ceiling 35. As illustrated in FIG. 11B, the image display device of the present disclosure may be combined with a configuration in which the typical conventional projectors 100T and 100B with a throw ratio of 1.1 or more are arranged at the ceiling 35 and the floor 36 to display images on the floor 36 and the ceiling 35, respectively. Then, with these configurations, images are projected on the surroundings, underfoot, and on the ceiling 35, so that the ground, the sky, and the like can be expressed, and a more immersive feeling can be obtained. Note that light rays projected by the typical conventional projectors 100T and 100B are indicated by long dashed short dashed lines.

Figure 12A:
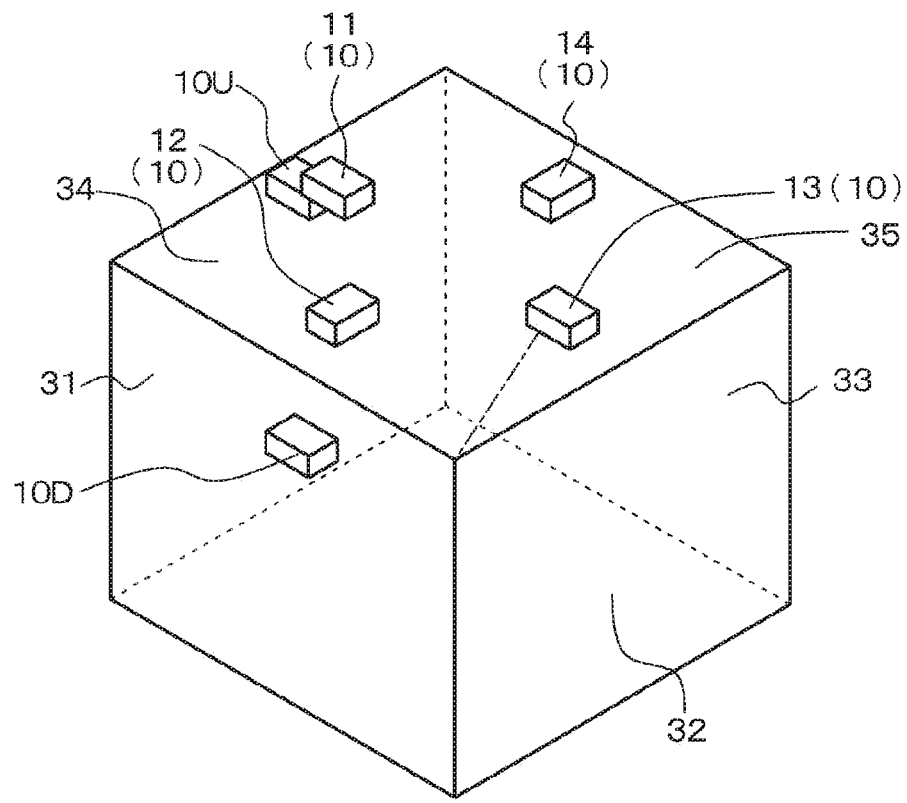
FIGS. 12A and 12B are conceptual diagrams of the image display device similar to the section of the image display device taken along the arrow B-B in FIG. 1A, illustrating a combination of the image display device of the present disclosure and a configuration in which an ultra-short focus projector is arranged on the back side of a wall or the like to project an image on the ceiling and/or the floor.
Figure 12B:
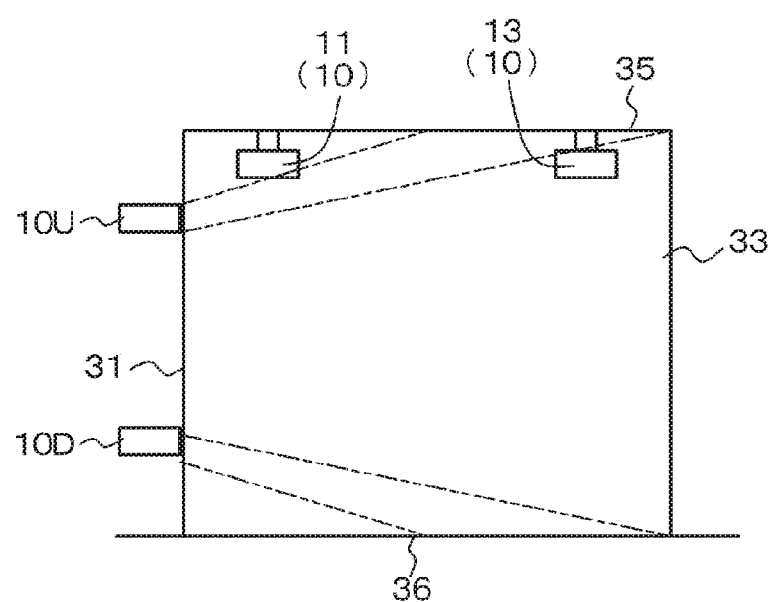

Furthermore, as illustrated in conceptual diagrams in FIGS. 12A and 12B, the image display device of the present disclosure may be combined with a configuration in which, in order to project an image on the floor 36 or the ceiling 35, ultra-short focus projectors 10U and 10D are arranged on the back sides of side walls 31, 32, 33, and 34 (or screens) to project an image on the ceiling 35 and/or the floor 36 through minimum openings for projection. Note that FIGS. 12A and 12B are conceptual diagrams of the image display device illustrating a combination of the image display device of the present disclosure and a configuration in which ultra-short focus projectors are arranged at the floor 36 or the back sides of side walls or the like to project an image on the ceiling 35 and/or the floor 36. Then, with this arrangement, images are projected on the surroundings, underfoot, and on the ceiling 35, so that the ground, the sky, and the like can be expressed. Moreover, it is possible to minimize an influence of a shadow of a viewer, and a more immersive feeling can be obtained. Note that light rays projected by the projectors 10U and 10D are indicated by long dashed short dashed lines. In some cases, only one of the projectors 10U and 10D may be provided.

Note that the present disclosure may also have the configurations as described below.

[A01] <<Image Display Device>>

An image display device including:

M (M≥2) ultra-short focus projectors and reflective directional screens that reflect projection light rays from the corresponding ultra-short focus projectors, in which the ultra-short focus projectors are arranged above or below the directional screens on which the ultra-short focus projectors are supposed to project images, adjacent directional screens are tightly arranged, and the adjacent directional screens are arranged to form an angle of less than 180 degrees.

[A02] The image display device according to [A01], in which each of the directional screens has a curved surface within a range of a depth of focus of a projection lens included in the corresponding ultra-short focus projector.

[A03] The image display device according to [A01] or [A02], further including a position detection device that detects a position, with respect to the corresponding directional screen, of an object in contact with a light reflecting surface of the directional screen, or an object close to the light reflecting surface of the directional screen.

[A04] The image display device according to any one of [A01] to [A03], in which each of the directional screens reflects projection light rays from the corresponding ultra-short focus projector to cause the projection light rays to travel in parallel to each other and in a predetermined direction.

[A05] The image display device according to [A04], in which the predetermined direction is a direction normal to the light reflecting surface of the directional screen.

[A06] The image display device according to [A04] or [A05], in which the light reflecting surface of the directional screen has a Fresnel shape in which arc-shaped projections and depressions having a predetermined width are arranged concentrically.

[A07] The image display device according to [A06], in which the light reflecting surface of the directional screen does not include an optical center of the Fresnel shape.

[A08] The image display device according to [A06] or [A07], in which
the ultra-short focus projector has an image emitting unit located at the optical center of the Fresnel shape.
[A09] The image display device according to any one of [A01] to [A03], in which
each of the directional screens reflects projection light rays from the corresponding ultra-short focus projector to cause the projection light rays to travel as converging light in a predetermined direction.
[A10] The image display device according to [A09], in which
the predetermined direction is a direction toward a position where a viewer views the directional screens.
[A11] The image display device according to [A09] or [A10], in which
the light reflecting surface of the directional screen has a Fresnel shape in which elliptical arc-shaped projections and depressions having a predetermined width are arranged concentrically.
[A12] The image display device according to [A11], in which
the light reflecting surface of the directional screen does not include an optical center of the Fresnel shape.
[A13] The image display device according to [B3] or [A12], in which
the ultra-short focus projector has an image emitting unit located at the optical center of the Fresnel shape.
[A14] The image display device according to any one of [A04] to [A13], including
M' (M'≥3) ultra-short focus projectors and directional screens that display images from the corresponding ultra-short focus projectors,
in which at least two of the M' directional screens are arranged to face each other in parallel.
[A15] The image display device according to [A14], in which
when projection light rays reflected by a first of the directional screens arranged to face each other in parallel collide with a second directional screen, the projection light rays reflected by the second directional screen do not travel toward the first directional screen.
[A16] The image display device according to any one of [A01] to [A15], in which
an image projected across adjacent directional screens is projected continuously on the adjacent directional screens.
[A17] The image display device according to [A16], in which
the image projected across the adjacent directional screens is projected in a state of being enlarged in a horizontal direction.
[A18] The image display device according to any one of [A01] to [A16], in which
images are projected on the directional screens in a state in which a degree of enlargement in a horizontal direction is greater as a position is closer to a horizontal edge of each directional screen.
[A19] The image display device according to any one of [A01] to [A18], further including
an ultra-short focus projector that is attached to an upper portion of a wall and projects a video on a ceiling.
[A20] The image display device according to any one of [A01] to [A19], further including
an ultra-short focus projector that is attached to a lower portion of a wall and projects a video on a floor.
[A21] The image display device according to any one of [A01] to [A20], further including
a projector with a throw ratio of 1.1 or more that is arranged at the ceiling and projects a video on the floor.
[A22] The image display device according to any one of [A01] to [A21], further including
a projector with a throw ratio of 1.1 or more that is arranged at the floor and projects a video on the ceiling.

REFERENCE SIGNS LIST 10, 11, 12, 13, 14, 10U, 10D Ultra-short focus projector
20, 21, 22, 23, 24 Directional screen
20A First virtual plane
20B Second virtual plane
20C Third virtual plane
25 Virtual cylindrical screen
31, 32, 33, 34 Wall
35 Ceiling
36 Floor
40 Fresnel shape
41 Projections and depressions
42 Optical center
50 Viewer
50' Viewer's shadow
61 Infrared light emitting device
62 Infrared barrier
63 Infrared light receiving device
70 Object
100T, 100B Typical conventional projector with throw ratio of 1.1 or more

What is claimed is:
1. An image display device comprising:
M (M≥2) ultra-short focus projectors; and
directional screens that reflect projection light rays from corresponding ultra-short focus projectors,
wherein the ultra-short focus projectors are arranged above or below the directional screens,
wherein adjacent directional screens are arranged to form an angle of less than 180 degrees,
wherein a light reflecting surface of each directional screen has a Fresnel shape in which arc-shaped projections and depressions having predetermined widths are arranged concentrically so that when projection light rays reflected by a first directional screen of the directional screens collide with a second directional screen of the directional screens, the projection light rays reflected by the second directional screen do not travel toward the first directional screen, wherein the first directional screen and the second directional screen are parallel to one another, and
wherein images are projected on the directional screens in a state in which a degree of enlargement in a horizontal direction is greater as a position is closer to a horizontal edge of each directional screen so that the images projected on the directional screens contain less distortion.
2. The image display device according to claim 1, wherein each of the directional screens has a curved surface within a range of a depth of focus of a projection lens included in a corresponding ultra-short focus projector.
3. The image display device according to claim 1, further comprising
a position detection device that detects a position, with respect to a corresponding directional screen, of an object in contact with a light reflecting surface of the corresponding directional screen, or an object close to the light reflecting surface of the corresponding directional screen.

4. The image display device according to claim 1, wherein each of the directional screens reflects light rays from a corresponding ultra-short focus projector to cause the light rays to travel in parallel to each other and in a predetermined direction.

5. The image display device according to claim 4, wherein the predetermined direction is a direction normal to a light reflecting surface of a corresponding directional screen.

6. The image display device according to claim 1, wherein the light reflecting surface of each directional screen does not include an optical center of the Fresnel shape.

7. The image display device according to claim 1, wherein at least one ultra-short focus projector of the ultra-short focus projectors has an image emitting unit located such that light from the at least one ultra-short focus projector does not reflect from an optical center of the Fresnel shape.

8. The image display device according to claim 1, wherein an image projected across two adjacent directional screens is projected continuously on the two adjacent directional screens.

\* \* \* \* \*